UNITED STATES PATENT OFFICE.

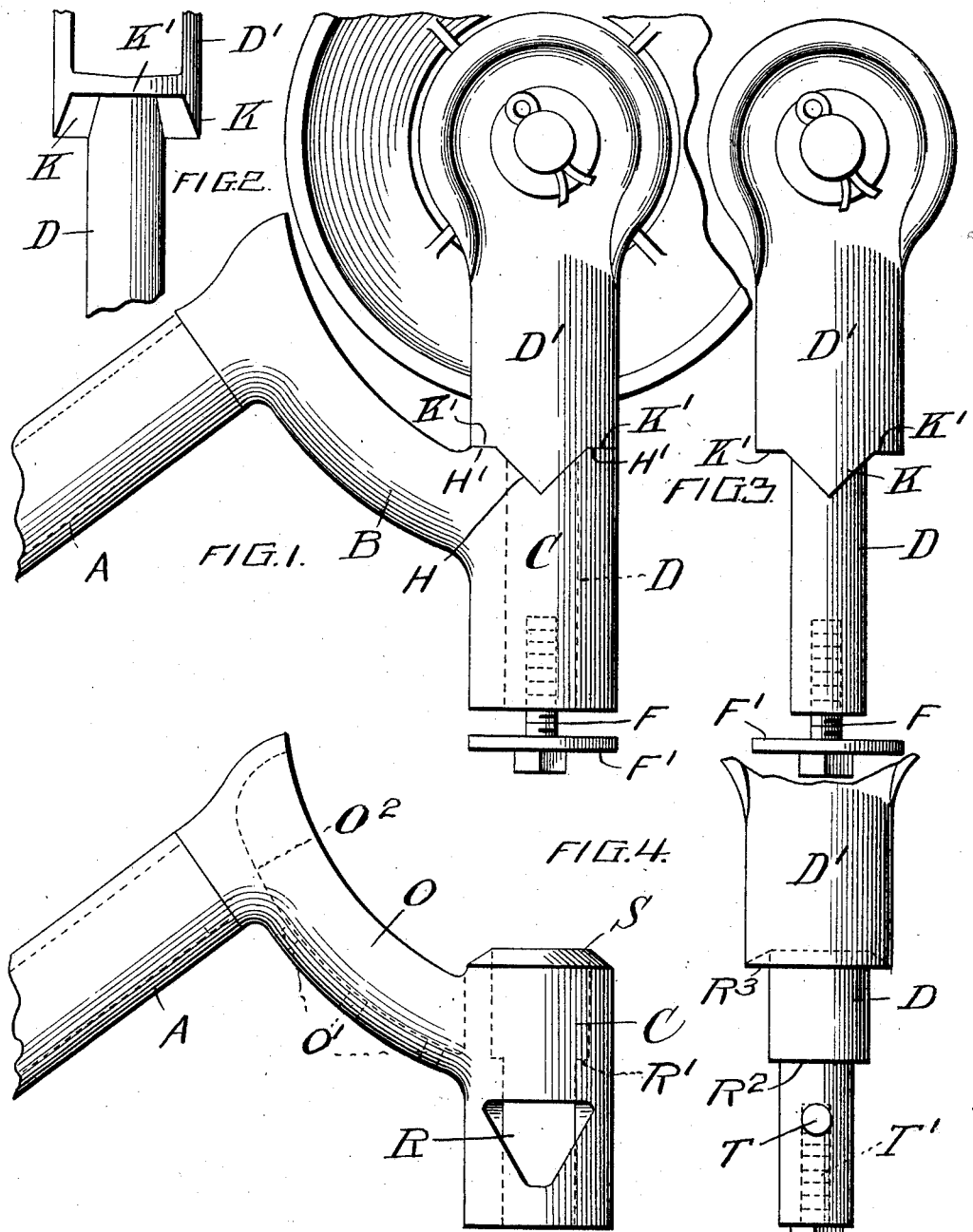

JAMES HENRY FINCH, JR., OF DORCHESTER, MASSACHUSETTS.

TROLLEY-WHEEL RETAINER.

1,039,918.  Specification of Letters Patent.  Patented Oct. 1, 1912.

Application filed September 25, 1911. Serial No. 651,147.

*To all whom it may concern:*

Be it known that I, JAMES H. FINCH, Jr., a citizen of the United States, residing at Dorchester, in the county of Suffolk and State of Massachusetts, have invented certain new and useful Improvements in Trolley-Wheel Retainers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in trolley wheel retainers and the object in view is to generally improve upon and render more efficient devices of this nature.

More specifically the invention consists of means, in connection with a trolley wheel retainer, whereby, as the wheel moves about a curve, the wheel will be caused to rise slightly and return to its normal position when the curve is passed, means being provided to protect the joint intermediate the bearing and the shank portion of the trolley head.

The invention consists further in the provision of means for strengthening the bearing parts intermediate the hanger and the trolley head, as will be hereinafter fully described and then specifically defined in the appended claim.

I illustrate my invention in the accompanying drawings, in which:—

Figure 1 is a side elevation of a trolley device. Fig. 2 is a view taken in a plane at right angles to that shown in Fig. 1 with the hanger removed. Fig. 3 is a detail view of the trolley head removed from the hanger, and Fig. 4 is a view in elevation of a modification of the invention.

Reference now being had to the details of the drawings by letter, A designates the trolley pole and B the hanger which is provided with a cylindrical outlined bearing portion C in which a contracted portion D of the trolley head D' is adapted to have a bearing. The bottom of said contracted part D has a threaded hole for the reception of the stop screw F with a flanged head F' positioned a distance from the bottom of the bearing C, equal to the throw of the head. The upper edge of the cylindrical portion C is provided with V-shaped recesses H at positions diametrically opposite, the upper inclined edges of the V-shaped recesses terminating in flat parts H'. At the upper end of the contracted portion D of the trolley head are the pointed shoulders K, conforming to and adapted to fit the inclined recesses formed in said bearing portion C, while portions K' intermediate the V-shaped parts K are flat and adapted to rest upon the flat portions H', as shown clearly in Fig. 1 of the drawings.

In Fig. 4 of the drawings I have shown a modification of the invention in which the trolley hanger O is provided with apertures O' through which water is adapted to run, the hanger being hollowed out as at $O^2$ for the purpose of lightening its weight. The cylindrical portion C of the hanger has triangular outlined openings, one of which R is shown in the drawings and the interior of said bearing part of the hanger has a shoulder R' upon which a shoulder $R^2$ of the shank portion of the trolley head is adapted to rest and immediately above the shoulder $R^2$ is a shoulder $R^3$ with an undercut part adapted to rest upon the beveled portion S of the bearing part of the hanger. A pin T passes through an aperture in the contracted portion of the trolley head and is held in place by a set screw T'.

In the form shown in Figs. 1 to 3 of the drawings, it will be noted that, as there is a tendency for the trolley head to turn independent of the hanger, the inclined surfaces coming in contact with each other will cause a longitudinal movement to be imparted to the trolley head which would be occasioned by a trolley passing about a curve or for other reasons and, when the wheel is moving upon a straight line, the parts will return to their normal positions by gravity. By reason of the flange at the end of the screw, the longitudinal movement of the head is limited. Owing to the inclined contracted surfaces intermediate the hanger and the trolley head, a greater bearing surface is afforded, causing additional strength.

By the modified form the undercut shoulder resting upon the bevel of the shell and the bearing part of the hanger, water and foreign matter will be prevented from collecting between the joints of the bearing members.

In the form shown in Fig. 4 of the drawings, the rotary movement of the trolley head will be limited by the ends of the triangular outlined slot formed in the hanger.

What I claim to be new is:—

A device for preventing trolley wheels from leaving trolley wires, comprising a hanger having a hollow bearing member with its upper end beveled and having an annular shoulder upon the inner surface thereof, a trolley head having an undercut shoulder having a bearing upon the beveled end of the bearing portion of the hanger and a shank portion with a shoulder adapted to rest upon said shoulder formed upon the inner surface of the bearing portion of the hanger and its lower end contracted, said bearing portion provided with an angular-outlined opening in the wall thereof, said contracted part of the shank portion of the trolley head having a transverse aperture therein, a pin mounted in said aperture and extending into the opening in the wall of the bearing member, and a screw fitted in a threaded hole formed in the lower end of said contracted part of the shank portion and engaging said pin, as set forth.

In testimony whereof I hereunto affix my signature in the presence of two witnesses.

JAMES HENRY FINCH, Jr.

Witnesses:
ROBERT D. MORSE,
JACOB JACOBSEN.

Copies of this patent may be obtained for five cents each, by addressing the "Commissioner of Patents, Washington, D. C."